3,326,896
EMBONIC ACID ADDITION SALTS OF 10,11-DIHYDRO-5H-DIBENZ[b,f]AZEPINES
Elvin A. Holstius, White Plains, N.Y., assignor to Geigy Chemical Corporation, Greenburgh, N.Y., a corporation of Delaware
No Drawing. Filed July 8, 1965, Ser. No. 470,601
3 Claims. (Cl. 260—239)

This application is a continuation-in-part of copending application Ser. No. 339,879, filed Jan. 24, 1964, now abandoned.

The present invention pertains to novel compounds having valuable pharmacological properties and in particular to compounds useful as thymoleptic agents in the treatment of depressive states.

The compounds of the present invention are embonic acid addition salts which may be represented by the formulae:

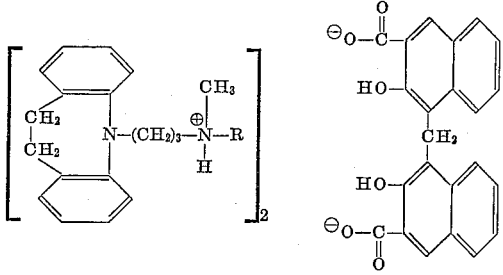

in which R is hydrogen or methyl, and

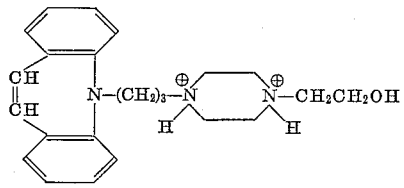

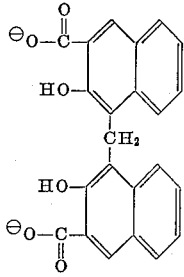

More specifically, the instant invention contemplates the embonic acid addition salt of 5-(3-dimethylaminopropyl)-10,11-dihydro - 5H - dibenz[b,f]azepine; the embonic acid addition salt of 5-(3-methylaminopropyl)-10,11-dihydro-5H-dibenz[b,f]azepine; and the embonic acid addition salt of 4-[3-(5H-dibenz[b,f]azepin - 5 - yl)-propyl-]-1-[2-hydroxyethyl)-piperazine.

These compounds are effective in both endogenous and exogenous depression of diverse psychopathology including periodic endogenous depression, the depressive phase of manic-depression; involutional melancholia, reactive depression, depression associated with senility, depression associated with organic lesions such as cerebral arteriosclerosis or Parkinsonism, depression associated with psychiatric disorders such as schizophrenia, alcoholism and mental deficiency and the like.

The antidepressant agents provided by the present invention are highly effective orally with an extremely low toxicity. It is surprising that while the compounds of this invention are apparently slowly absorbed by the body upon oral administration, thus perhaps explaining the prolonged body plasma and tissue levels which are observed, transport across the blood brain barrier is unimpaired. Furthermore these compounds are free from any unpleasant taste or local anesthetic properties and are stable when stored under aqueous conditions. Accordingly, these compounds are admirably suited for oral pharmaceutical antidepressant preparations which are effective for long intervals.

Special mention is made of the surprisingly low toxicity of the instant embonic acid addition salts. In particular, the following data have been found: the embonic acid addition salt of 5-(3-dimethylaminopropyl)-10,11-dihydro-5H-dibenz[b,f]azepine, suitable according to the present invention for masking the local anesthetic effect of the free base, was tested in comparison with the hydrochloric acid addition salt of 5-(3-dimethylaminopropyl) 10,11-dihydro-5H-dibenz[b,f]azepine.

Toxicity was determined in non-fasted animals, ten mice per group and three rats per group, for each dose level. The following $LD_{50}$'s were found in mice:

| $LD_{50}$ i.p.: | Mg./kg. |
|---|---|
| Sodium embonate | 320 |
| Embonic acid addition salt of 5-(3-dimethylaminopropyl) - 10,11 - dihydro - 5H - dibenz[b,f]azepine | 575±25 |
| Hydrochloric acid addition salt of 5-(3-dimethylaminopropyl) - 10,11 - dihydro-5H-dibenz[b,f]azepine | 110 |
| $LD_{50}$ p.o.: | |
| Sodium embonate | 2500 |
| Embonic acid addition salt of 5-(3-dimethylaminopropyl) - 10,11 - dihydro - 5H-dibenz-[b,f]azepine | 7500 |
| Hydrochloric acid addition salt of 5-(3-dimethylaminopropyl) - 10,11 - dihydro-5H-dibenz-[b,f]azepine | 400 |

In rats, the embonic acid addition salt of 5-(3-dimethylaminopropyl)-10,11-dihydro-5H - dibenz[b,f]azepine had an $LD_{50}$ i.p. of 300–500 mg./kg. and peroral $LD_{50}$ of 6000 mg./kg.

These data are completely unexpected. Considering that the embonic acid addition salt of 5-(3-dimethylaminopropyl)-10,11-dihydro-5H-dibenz[b,f]azepine has twice the molecular weight of the hydrochloric acid addition salt of 5-(3-dimethylaminopropyl)-10,11-dihydro-5H-dibenz[b,f]azepine, those skilled in the art would expect a lower toxicity with the former. However, the exceedingly lower intraperitoneal and peroral toxicity in mice of the embonic acid addition salt cannot be accounted for by differences in molecular weight, the peroral toxicity of the embonate being 19 times less than that of the hydrochloride. This surprising finding of reduced acute toxicity represents a significant and surprising advantage in that it permits less frequent dosage with reduced liability of acute poisoning from a single overdose.

Furthermore as is mentioned hereinabove the instant compounds are more slowly absorbed. In comparison with the hydrochloric acid addition salts of the prior art, for example, this property of the instant compounds is of considerable advantage clinically in that it permits the maintenance of more constant plasma and tissue levels of the physiologically active base. Specifically, Royal Hart female rats, weighing 150–160 grams are given, by stomach tube, 100 and 400 mg./kg. doses of the respective embonic acid addition salt and hydrochloric acid addition salt of 5-(3-dimethylaminopropyl)-dihydro-5H-dibenz[b,f] azepine. Three rats are used for each time period and the plasma and brains of the three rats are pooled for analysis. It is found that the hydrochloride salt treated animals attain elevated plasma and brain levels more rapidly than those treated with the embonate salt, as observed 2 and 5 hours after drug administration. However at 8 hours the levels attained with the embonate equal or exceed those of the hydrochloride. These data indicate that there is a delayed absorption of the embonate, but that with time all the embonate is absorbed and therapeutic plasma levels are obtained. Special mention is made of data obtained when 100 mg./kg. of the respective embonate salts are administered under the above-designated conditions in a peanut oil vehicle. The amount of drug found in the plasma in micrograms per milliliter at 2 hours is 0.4 (embonate), 2.1 (hydrochloride); at 5 hours is 0.8 (embonate), 1.4 (hydrochloride); and at 8 hours is 1.4 (embonate), 0.4 (hydrochloride). Thus it is seen that there is a slower rate of absorption of the embonate, but that at 8 hours, the levels attained with the embonate exceed those of the hydrochloride.

The compounds of the present invention are prepared by treating 5 - (3 - dimethylaminopropyl)-10,11-dihydro-5H - dibenz[b,f]azepine; 5 - (3 - methylaminopropyl)-10,11-dihydro-5H-dibenz[b,f]azepine or 4-[3-dibenz[bf]azepin-5-yl)-propyl]-1-(2-hydroxyethyl)-piperazine either as the free bases, or in the form of easily accessible salts such as the hydrochloride, with embonic acid, also known as 2,2'-dihydroxy-1,1'-dinaphthylmethane - 3,3' - dicarboxylic acid (and as pamoic acid), in the free form or in the form of a soluble salt, particularly an alkali metal salt, e.g. the sodium salt. The reaction is preferably performed in an aqueous medium or in mixtures of water and water miscible organic solvents such as methanol ethanol, acetone, dioxane, dimethyl formamide, propylene glycol, Cellosolve, and the like. The reaction products which are difficultly soluble in the reaction media, are isolated by filtering or centrifuging.

The ratio of embonic acid or salt thereof to the corresponding base or salt thereof can vary greatly. Preferably however, equimolar amounts are used when the embonate of 4-[3 - (5H - dibenz[b,f]azepin - 5 - yl) - propyl]-1-(2-hydroxyethyl)-piperazine is prepared, and if the base is 5 - (3 - dimethylaminopropyl) - 10,11 - dihydro - 5H-dibenz[b,f]azepine or 5 - (3-methylaminopropyl)-10,11-dihydro-5H-dizenz[b,f]azepine, 2 moles of base (or salt) are used for each 1 mole of embonic acid (or salt).

Upon satisfactory purification as by washing and drying, the product may be formulated into suitable pharmaceutical forms such as tablets, capsules, powders, suspensions, syrups and the like. Such formulations are then administered to patients, the dose administered necessarily being adjusted for each individual. Usually a dosage of from 50 to 200 mg. is suitable as an initial daily dose. This may be increased by from 25 to 50 mg. every few days up to 500 to 750 mg. daily. When necessary, even higher doses can be safely administered. These compounds are also highly effective when administered via injection.

The following examples will serve to further typify the nature of this invention but should not be construed as limitations thereof.

EXAMPLE 1

To a solution of 432.25 g. (one mole) of disodium 2,2' - dihydroxy - 1,1' - dinaphthylmethane - 3,3'-dicarboxylate(embonic acid) in approximately 6.5 liters of water are slowly added with stirring, 633.8 g. (2.0 moles) of 5-(3-dimethylaminopropyl) - 10,11 - dihydro - 5H-dibenz[b,f]azepine hydrochloride in approximately 3 liters of water. The mixture is rapidly agitated for one-half hour and the solid which forms is collected by filtration and washed with water until a negative chloride ion test with silver nitrate is obtained. The product is then dried in vacuo at 60° C. for approximately 48 hours to yield the bis[5-(3-dimethylaminopropyl)-10,11 - dihydro-5H - dibenz[b,f]azepine]salt of 2,2' - dihydroxy - 1,1'-dinaphthyl-methane-3,3' - dicarboxylic acid, M.P. 125–150° C.

In a similar fashion by employing 605.8 g. of 5-(3-methylaminopropyl)-10,11 - dihydro - 5H - dibenz[b,f]azepine hydrochloride in this procedure, the corresponding bis[5 - (3 - methylaminopropyl) - 10,11 - dihydro-5H-dibenz[b,f]azepine salt of 2,2' - dihydroxy-1,1'dinaphthylmethane-3,3'-dicarboxylic acid, M.P. 125–150° C. is obtained.

In a similar fashion by employing 43.6 g. (0.1 mole) of 4 - [3 - 5H - dibenz[b(f] - azepin - 5 - yl)-1-(2-hydroxyethyl) - piperazine dihydrochloride and 43.2 g. (0.1 mole) of disodium embonate, the corresponding 4-[3 - (5H - dibenz[b,f] - azepin - 5 - yl) - propyl]-1-(2-hydroxyethyl)-piperazine salt of 2,2' - dihydroxy - 1,1'-dinaphthylmethane-3,3' - dicarboxylic acid, M.P. 149–176° C. is obtained.

EXAMPLE 2

36.1 g. (0.1 mol) of 4 - [3 - (5H - dizenz[b,f]azepin-5-yl)-propyl]-1-(2-hydroxyethyl) - piperazine are dissolved while gently heating in 250 ml. of 96% ethanol and the solution is poured into a solution of 38.8 g (0.1 mol) of embonic acid in 250 ml. of dimethyl formamide. The reaction solution is filtered through animal charcoal and the filtrate is then added dropwise over a period of 45 minutes to 500 ml. of ice water while stirring vigorously. The fine yellow precipitate is stirred for 1 hour at room temperature and then filtered. The filter residue is washed with 1 litre of distilled water and dried in vacuo for 16 hours at 80–90° C. The product is identical with that obtained according to Ex. 1, M.P. 151–171°.

EXAMPLE 3

In a stainless steel container are mixed 30 g. of methylparaben U.S.P., 4 g. of propylparaben U.S.P. and 4 liters of distilled water at 80° C. There is then added 60 g. of disodium ethylenediamine tetraacetate dihydrate followed by 1000 g. of glycerin and 4000 g. of a 70% sorbitol solution U.S.P. After thoroughly mixing, the solution is cooled to 30 to 35° C. and 160 g. of Veegum® (colloidal magnesium aluminum silicate). The mixture is then stirred constantly for one hour and 8 g. of imitation flavor is added. With continued stirring, 172 g. of the bis[5-(3-dimethylaminopropyl)-10,11 - dihydro - 5H - dibenz[b,f]azepine] salt of 2,2'-dihydroxy-1,1'-dinaphthylmethane-3,3'-dicarboxylic acid are added together with sufficient cooled distilled water to yield a total of 20 liters. After mixing for 15 minutes, the suspension is homogenized and packaged.

One to two teaspoonfuls may be administered from one to four times per day. This aqueous suspension is stable upon storage and pleasant tasting.

EXAMPLE 4

| Ingredient: | Amount/capsule, mg. |
|---|---|
| bis[5-(3-methylaminopropyl)-10,11-dihydro-5H-dibenz[b,f]azepine]salt of 2,2'-dihydroxy-1,1'-dinaphthylmethane-3,3' - dicarboxylic acid | 45.00 |
| Corn starch | 100.00 |
| Lactose | 38.00 |
| CAB-O-SIL M-5 silica gel | 12.00 |

The above ingredients are thoroughly mixed and introduced into a No. 4 opaque capsule. From one to five such capsules may be administered daily to treat depression depending on the nature and degree of the specific condition.

In a similar fashion 47 g. of the bis[5-(3-dimethyl aminopropyl)-10,11-dihydro-5H - dibenz[b,f]azepine]salt of 2,2'-dihydroxy-1,1'-dinaphthylmethane - 3,3'-dicarboxylic acid is employed in the above procedure to obtain the corresponding formulation.

EXAMPLE 5

| Ingredient: | Amount/tablet, mg. |
|---|---|
| Corn starch | 27.48 |
| AMIGEL (Modified Corn Starch) | 7.92 |
| Lactose | 84.00 |
| Magnesium Stearate | 0.60 |
| bis[5-(3-dimethylaminopropyl) - 10,11 - dihydro - 5H-dibenz[b,f]azepine]salt of 2,2'-dihydroxy - 1,1'-dinaphthylmethane - 3,3'-dicarboxylic acid | 50.00 |

The first four ingredients are intimately mixed and then slightly moistened. After granulation and drying, the last ingredient is added and thoroughly mixed and the material pressed into a tablet. From one to five such tablets may be administered daily.

What is claimed is:

1. The embonic acid addition salt of 5-(3-dimethylaminopropyl)-10,11-dihydro-5H-dibenz[b,f]azepine.
2. The embonic acid addition salt of 5-(3-methylaminopropyl)-10,11-dihydro-5H-dibenz[b,f]azepine.
3. The embonic acid addition salt of a base selected from 5-(3-dimethylaminopropyl)-10,11 - dihydro-5H-dibenz[b,f]azepine and 5-(3-methylaminopropyl)-10,11-dihydro-5H-dibenz[b,f] azepine.

References Cited

UNITED STATES PATENTS

| | | | |
|---|---|---|---|
| 3,033,866 | 5/1962 | Saggiomo et al. | 260—268 |
| 3,074,931 | 1/1963 | Craig | 260—268 |

FOREIGN PATENTS

| | | |
|---|---|---|
| 869,473 | 5/1961 | Great Britain. |

OTHER REFERENCES

Bon et al., Journ. Can. Med. Assoc., vol. 86, pages 1030–1031, 1961.

Burger, Medicinal Chemistry, 2nd edition (New York, 1960) pages 46–47.

Sigg et al., Journ. Pharm. and Exptl. Therapeutics, vol. 142, No. 1, pages 13–20, September 1963.

ALEX MAZEL, *Primary Examiner.*

HENRY R. JILES, *Examiner.*

J. W. ADAMS, *Assistant Examiner.*